United States Patent
Moarefi

(10) Patent No.: US 11,085,483 B2
(45) Date of Patent: Aug. 10, 2021

(54) JOINT SYSTEM

(71) Applicants: Hyundai Motor Company, Seoul (KR); Kia Motors Corporation, Seoul (KR)

(72) Inventor: Bahman Moarefi, Ruesselsheim (DE)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 471 days.

(21) Appl. No.: 16/049,324

(22) Filed: Jul. 30, 2018

(65) Prior Publication Data

US 2019/0353198 A1 Nov. 21, 2019

(30) Foreign Application Priority Data

May 15, 2018 (DE) ........................ 102018207462.3

(51) Int. Cl.
*F16B 39/24* (2006.01)
(52) U.S. Cl.
CPC .................... *F16B 39/24* (2013.01)
(58) Field of Classification Search
CPC .......... F16B 39/24; F16B 37/04; F16B 23/00; Y10T 403/75; Y10T 403/7062
USPC ........................................................ 411/432
See application file for complete search history.

(56) References Cited

U.S. PATENT DOCUMENTS

| | | | |
|---|---|---|---|
| 4,515,043 A | 5/1985 | Gray | |
| 5,110,245 A * | 5/1992 | Hiroyuki | F16B 25/0015 411/417 |
| 6,158,938 A * | 12/2000 | Savoji | F16B 35/047 411/386 |
| 2006/0084997 A1* | 4/2006 | Dejardin | A61B 17/1725 606/62 |
| 2006/0106390 A1* | 5/2006 | Jensen | A61B 17/8685 606/318 |
| 2011/0036207 A1 | 2/2011 | Yang | |
| 2016/0252125 A1* | 9/2016 | Lares | F16B 23/0038 411/402 |

FOREIGN PATENT DOCUMENTS

| | | |
|---|---|---|
| CN | 2659610 Y | 12/2004 |
| CN | 201125920 Y | 10/2008 |
| CN | 105782155 B * | 12/2017 |

(Continued)

*Primary Examiner* — Eret C McNichols
*Assistant Examiner* — Ding Y Tan
(74) *Attorney, Agent, or Firm* — Mintz Levin Cohn Ferris Glovsky and Popeo, P.C.; Peter F. Corless

(57) ABSTRACT

A joint system is provided that includes a dashed threaded fastener and a first fastener with a threaded aperture. The first fastener has at least one planetary gear with a second fastener on a surface thereof directed toward the dashed threaded fastener and a circumferential support rail. The planetary gear is disposed between the dashed threaded fastener and the circumferential support rail such that the planetary gear is rotatable round its axis. The dashed threaded fastener is configured to conduct a rotational movement such that the dashed threaded fastener moves along its axis through the first fastener. The planetary gear and the circumferential support rail rotate simultaneously in an opposite direction to the rotational movement of the dashed threaded fastener.

10 Claims, 7 Drawing Sheets

(56) References Cited

FOREIGN PATENT DOCUMENTS

| | | | | |
|---|---|---|---|---|
| DE | 3624748 | A1 | 2/1988 | |
| JP | 2009262293 | A * | 11/2009 | |
| JP | 2011075098 | A * | 4/2011 | .............. F16B 23/00 |
| JP | 5710908 | B2 * | 4/2015 | ........... B25B 13/488 |
| WO | 9300787 | A1 | 1/1993 | |
| WO | 2016176518 | A2 | 11/2016 | |

* cited by examiner

JOINT SYSTEM

CROSS-REFERENCE TO RELATED APPLICATION(S)

The present application claims priority to German Patent Application No. 102018207462.3 filed on May 15, 2018, the entire contents of which is incorporated herein for all purposes by this reference.

BACKGROUND

Field of the Invention

The present invention relates to a joint system for fastening or assembling components or parts, in particular unthreaded components, via a bolted joint.

Description of the Related Art

Recently, lightweight, high-strength, fiber-reinforced composite materials are becoming more important in the automotive industry. In particular, there is a developed interest in replacing conventional materials by lightweight composite, wherein different materials, for example, replacing a steel sheet with a composite material, have to be fastened or assembled to each other.

Typically a joint application requires high torque behavior. However, high torque typically requires high clamping force, wherein the high clamping force may damage the composite assembly. Consequently, there is a need to further improve coupling technologies, in particular bolt-nut coupling or fastening.

SUMMARY

The present invention relates to a joint system for fastening or assembling components or parts, for example, a steel sheet, a composite material and/or a fiber reinforced material.

An aspect of the invention relates to a joint system for fastening or assembling components or parts, in particular unthreaded components, via a bolted joint. Under the term "components" any materials, material combinations, like composite-steel, composite-composite or composite-aluminum shall be understood.

According to an exemplary embodiment of the present invention, a joint system may include a dashed threaded fastener. The dashed threaded fastener may be a bolt with an external thread or male thread, for example. The term "dashed" refers to that a thread or a screw thread may be in particular interrupted or includes recesses in regular intervals along the thread such that a gear may intermesh, interlock or interlink with the dashed threaded fastener.

The joint system may further include a first fastener with a threaded aperture. The first fastener with the threaded aperture may be a nut having an internal thread or female thread. The first fastener may include at least one planetary gear with a second fastener on a surface directed toward the dashed threaded fastener. In other words, on the surface of the first fastener which faces a head of the dashed threaded fastener, the at least one planetary gear with the second fasteners may be arranged, mounted or located. The second fastener may be oriented parallel to a longitudinal extent of the dashed threaded fastener. The at least one planetary gear with the second fastener may be an integral part of the planetary gear such that the rotational movement may also be conducted by the second fastener. The second fastener may rotate axisymmetric with the at least one planetary gear.

The described dashed threaded fastener may provide two functionalities. One given by the respective thread of the dashed threaded fastener and the first fastener with the threaded aperture. The interruptions or recesses in the regular intervals within the thread of the dashed threaded fastener may fulfill the second functionality as a helical gear based on the thread which interacts with the at least one planetary gear with the second fastener.

Further, the joint system may include a circumferential support rail. The circumferential support rail may be configured to rotate in an opposite direction than the dashed threaded fastener or in a same direction as the at least one planetary gear with the second fastener. The circumferential support rail and the planetary gear may be essentially arranged on same plane with respect to the surface of the first fastener. The circumferential support rail may be a gear which interacts with the at least one planetary gear with the second fastener as well as the dashed threaded fastener. The circumferential support rail may have teeth directed or extending toward the at least one planetary gear with the second fastener.

The dashed threaded fastener and the first fastener with the threaded aperture interact with each other, wherein the dashed threaded fastener may be rotated in the threaded aperture of the first fastener. Therefore, the first fastener may be prevented from rotating by an additional tool or vice versa. The at least one planetary gear with the second fastener may be disposed between the dashed threaded fastener and the circumferential support rail to allow the at least one planetary gear to be rotatable around its axis. As described, the dashed threaded fastener and the first fastener with the threaded aperture interact with each other. Consequently, the at least one planetary gear with the second fastener mounted on the surface of the first fastener may also interact with the dashed threaded fastener and the circumferential support rail via corresponding gear teeth.

The dashed threaded fastener may be configured to conduct a rotational movement to allow the dashed threaded fastener to move along the axis thereof through the first fastener with the threaded. The at least one planetary gear with the second fastener and the circumferential support rail may rotate simultaneously in an opposite direction to the rotational movement of the dashed threaded fastener.

The idea of the invention is in particular to provide the joint system to more efficiently fasten or assemble components to each other while reducing high torque. Accordingly, an axial clamping force may be efficiently reduced. For example, sideways shear forces may be reduced or prevented.

For example, the second fastener may be more easily screwed in the corresponding component while reducing clamping force, whereby the second fastener may form its own thread in the components being fastened. This may be realized due to different gear ratios of the dashed threaded fastener and the at least one planetary gear with the second fastener since the fastener and the gear have the same speed at interface, otherwise the gear teeth would penetrate each other. Due to the additional coupling based on the at least one planetary gear with the second fastener, the clamping force on the corresponding joint may be reduced, prevented or eliminated.

According to an exemplary embodiment the gear ratio between the dashed threaded fastener and the at least one planetary gear with the second fastener is such that the rotation in the opposite direction of the second fastener is greater than the rotational movement of the dashed threaded fastener. In other words, the diameter of the dashed threaded fastener is greater than the diameter of the at least one planetary gear with the second fastener. Thus, the clamping force for high torque coupling may be reduced since the fastened or assembled components are arranged to each other such that relative rotation between the components may be prevented. The clamping force which has to be increased to push corresponding components together may be reduced or prevented by the structure of the joint system since a degree of freedom between the components may be efficiently reduced. For example, the degree of freedom may be zero.

According to a further exemplary embodiment the first fastener with the threaded aperture may include at least two or three mirror-symmetrically arranged planetary gears, wherein each of the planetary gears may include the second fastener. Thus, a relocation or turn of the jointed or assembled components may be prevented. In particular, this configuration may support the fastening or assembling of unthreaded components since the second fasteners may enter or be screwed into the corresponding components simultaneously. The planetary gears with the second fastener may also be understood as integral parts of the joint system.

According to another exemplary embodiment, the second fastener may have a tip with an acute angle. The acute angle of the tip may be configured such that the second fastener enters the unthreaded components more smoothly. For example, the acute angle may be in a range between about 10° to 30°, preferably between 15° and 25°. Additionally, the second fastener may have a helical shape or a screw shape, respectively. The second fastener may be a screw for example, wherein the second fastener may form its own thread in the corresponding components being fastened. Therefore, the second fastener may be more easily introduced in the unthreaded components.

According to a further exemplary embodiment the first fastener with the threaded aperture may include an inner support rail, wherein the inner support rail has a projection and the projection fits in a groove of the threaded fastener. The groove may run uniaxial along the dashed threaded fastener, wherein the inner support rail may be configured to conduct or transfer the rotational movement of the dashed threaded fastener. According to this exemplary embodiment the dashed threaded fastener may be replaced by a threaded fastener with the groove since the rotation of the at least one planetary gear with the second fastener may be conducted via the inner support rail with the projection. That is, the inner support rail may surround the threaded aperture, wherein gear teeth of the inner support rail may interact with the at least one planetary gear. The gear teeth of the inner support ring may be oriented toward the at least one planetary gear with the second fastener.

According to another exemplary embodiment the first fastener may include a connecting element on which the at least one planetary gear with the second fastener is mounted and rotatable. Based on the connecting element the at least one planetary gear may be positioned or mounted on the first fastener. The at least one planetary gear with the second fastener may include a different material than the dashed threaded fastener and/or the first fastener. For example, the at least one planetary gear with the second fastener may comprise high-strength steel or hardened and tempered steel. Therefore, a more stable bolted joint may be realized.

According to a yet another exemplary embodiment the circumferential support rail may be arranged or mounted on the surface of the first fastener. Therefore, a space-saving joint system may be provided. The circumferential support rail is part of a further support tool. In other words, the circumferential support rail may be removed after fastening or assembling the components or parts but is used to operate the joint system. The further support tool may also fix the first fastener. Therefore, the dashed threaded fastener may be rotated within the first fastener.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments, which are specified in the schematic figures, in which.

Unless indicated otherwise, like reference numbers or signs to the figures indicate like elements.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1A:
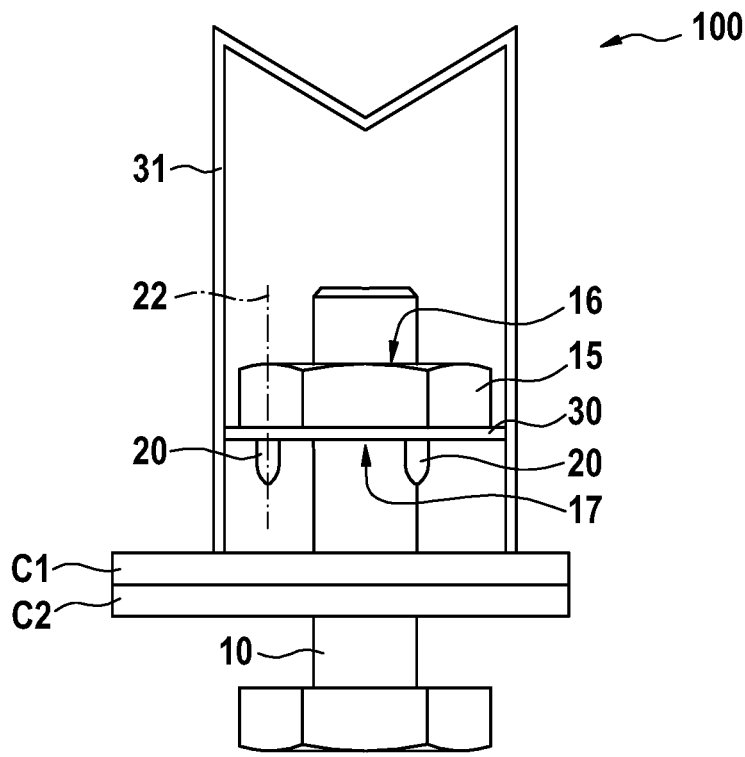
FIGS. 1A-1D illustrate a joint system during fastening or assembling of components according to a first exemplary embodiment of the invention.

FIGS. 1A-1D illustrate a joint system during fastening or assembling of components according to a first exemplary embodiment of the invention. FIG. 1A illustrates the joint system 100 for fastening or assembling components or parts, in particular unthreaded components C1, C2 via a bolted joint. A first component C1 may be a steel sheet and a second component C2 may be a composite sheet.

Further, the joint system 100 may include a dashed threaded fastener 10 (see also FIG. 2), a first fastener 15 with a threaded aperture 16. The dashed threaded fastener 10 may be a bolt with an external thread or male thread. The first fastener 15 with the threaded aperture 16 may be a nut with an internal thread or female thread. The first fastener 15 with the threaded aperture 16 may include at least one planetary gear G1, G2, G3 with a second fastener 20. The at least one planetary gear G1, G2, G3 with the second fastener 20 may be arranged, mounted or adjusted on a surface 17 of the first fastener 15. The at least one planetary gear G1, G2, G3 may be directed toward the dashed threaded fastener 10.

Figure 3:
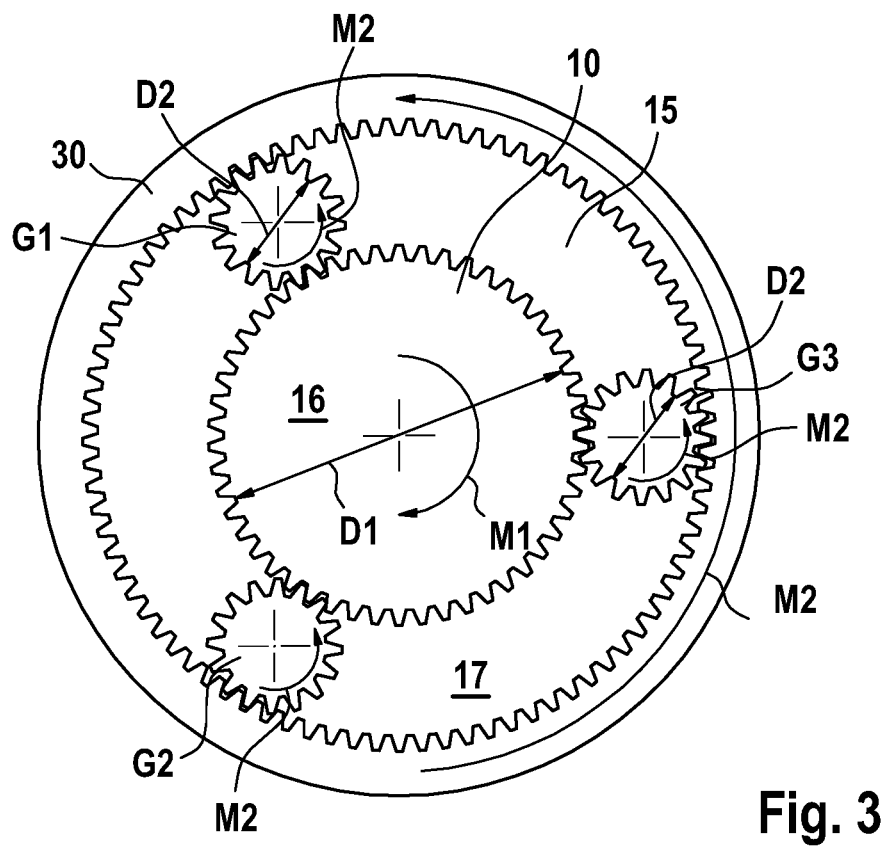
FIG. 3 illustrates rotation movements of the dashed threaded fastener, planetary gears and a circumferential support rail during operation according to the first exemplary embodiment of the invention.
Figure 4:
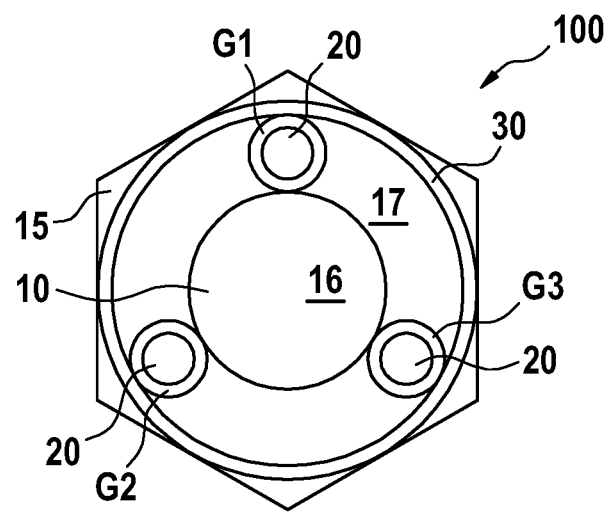
FIG. 4 illustrates a top view of a joint system according to a second exemplary embodiment of the invention.
Figure 5:
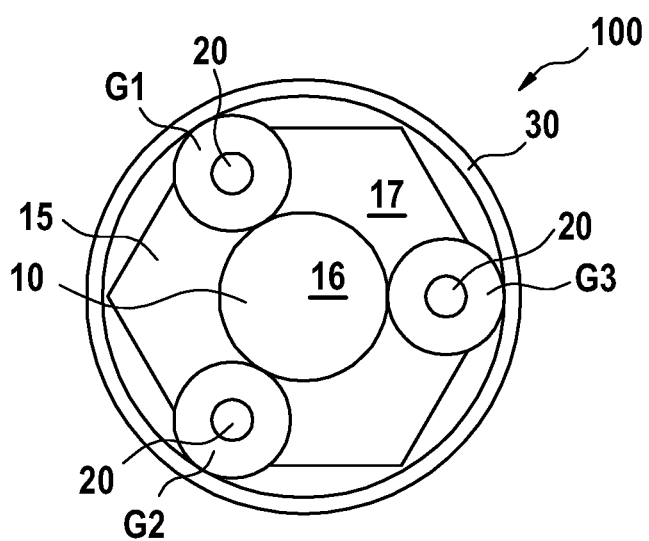
FIG. 5 illustrates a top view of a joint system according to a third exemplary embodiment of the invention.

The joint system 100 may also include a circumferential support rail 30, wherein the at least one planetary gear G1, G2, G3 may be disposed between the dashed threaded fastener 10 and the circumferential support rail 30 such that the at least one planetary gear G1, G2, G3 is rotatable round the axis 22 thereof (see also FIGS. 3, 4 and 5). The dashed threaded fastener 10 may be configured to conduct a rotational movement M1 to cause the dashed threaded fastener 10 to move along its axis through the first fastener 15 with the threaded aperture 16. The at least one planetary gear G1, G2, G3 and the circumferential support rail 30 may be configured to rotate simultaneously in an opposite direction M2 to the rotational movement M1 of the dashed threaded fastener 10 (see FIG. 3).

In FIGS. 1A to 1D the circumferential support rail 30 may be guided via a further support tool 31. Therefore, the circumferential support rail 30 may be part of the further support tool 31 or may be part of the joint system 100. The further support tool 31 may be used to fix the first fastener 15 with the threaded aperture 16 (not shown).

Figure 1B:
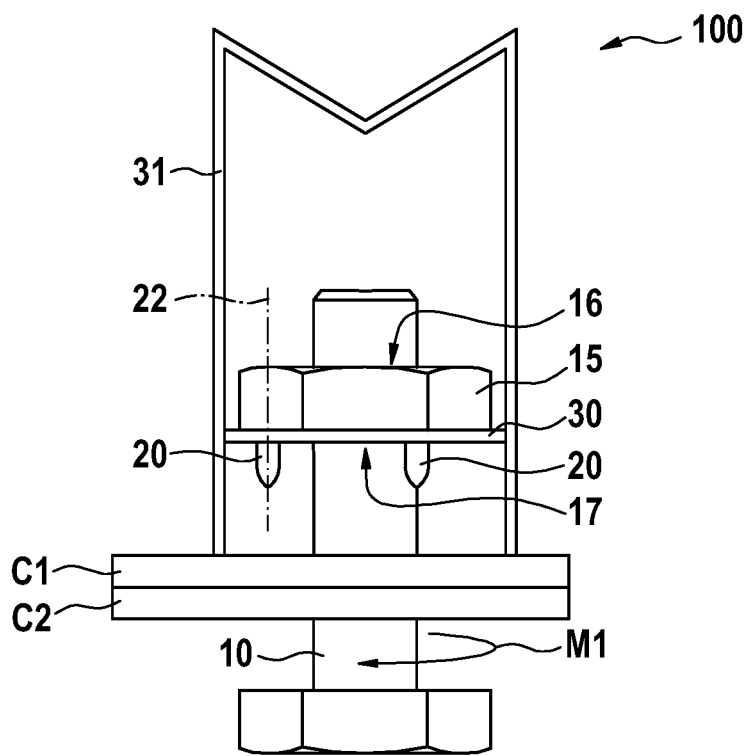
Figure 1C:
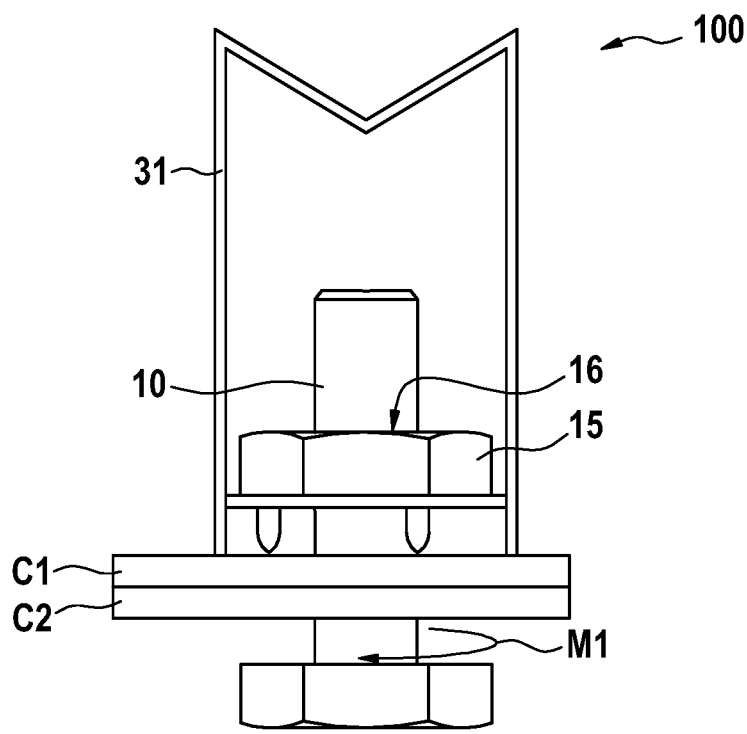

In FIGS. 1B and 1C the dashed threaded fastener 10 may be configured to rotate around an axis thereof and move along the axis through the threaded aperture 16 of the first fastener 15 and the second fastener 20. The circumferential support rail 30 may be configured to rotate simultaneously in an opposite direction M2 to the rotational movement M1 of the dashed threaded fastener 10. A gear ratio between the dashed threaded fastener 10 and the at least one planetary gear G1, G2, G3 is such that the rotation in the opposite direction M2 of the second fastener is greater than the rotational movement M1 of the dashed threaded fastener 10.

Figure 1D:
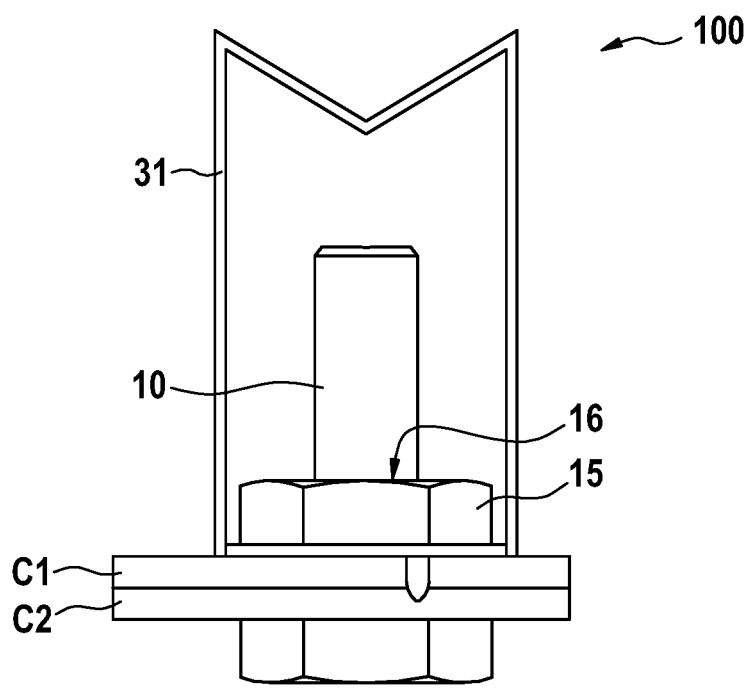

In FIG. 1D the second fastener may be screwed through the corresponding components or sheets C1, C2. Based on the above described joint system 100 configuration, an axial clamping force for high torque coupling may be efficiently reduced. For example, sideways shear forces may be reduced or prevented, accordingly.

Figure 2:
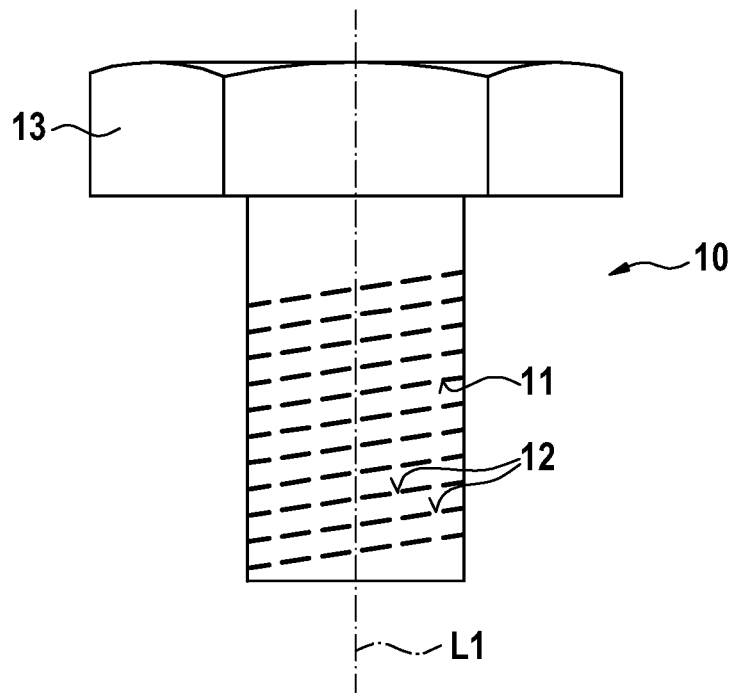
FIG. 2 illustrates a dashed threaded fastener of the joint system according to the first exemplary embodiment of the invention.

FIG. 2 illustrates a dashed threaded fastener of the joint system 100 according to the first exemplary embodiment of the invention. The joint system 100 may include the dashed threaded fastener 10. The term "dashed" means that a thread 11 or a screw thread may be interrupted or may include recesses 12 in regular intervals along the thread 11 such that the at least one planetary gear G1, G2, G3 may intermesh, interlock or interlink with the dashed threaded fastener 10. The dashed threaded fastener 10 may also simultaneously interact with first fastener 15 since the recesses 12 along the thread 11 may be arranged along a same longitudinal axis L1 of the dashed threaded fastener 10, wherein the longitudinal axis L1 runs parallel to a longitudinal extent of the dashed threaded fastener 10 (see FIG. 3). The dashed threaded fastener 10 may also include a head 13 and the second fastener 20 may be directed toward the head 13 of the dashed threaded fastener 10.

FIG. 3 illustrates rotation movements of the dashed threaded fastener 10, the planetary gears G1, G2 and G3 as well as the circumferential support rail 30 during operation. As illustrated in FIG. 3 the dashed threaded fastener 10 may be disposed in or inserted into the threaded aperture 16. The planetary gears G1, G2 and G3 may be rotatably arranged or mounted on the surface 17 of the first fastener 15.

The dashed threaded fastener 10 in FIG. 3 may be configured to rotate around its axis and move along the axis through the threaded aperture 16 of the first fastener 15, for example clockwise. The second fastener 20 as well as the circumferential support rail 30 may be configured to rotate simultaneously in an opposite direction M2 to the rotational movement M1 of the dashed threaded fastener 10, that is counter clockwise. A gear ratio between the dashed threaded fastener 10 and the at least one planetary gear G1, G2, G3 with the second fastener 20 is such that the rotation in the opposite direction M2 of the second fastener is greater than the rotational movement M1.

In other words, a diameter D1 of the dashed threaded fastener 10 is greater than a diameter D2 of the at least one planetary gear G1, G2, G3 with the second fastener 20. Thus, the clamping force during fastening or assembling may be reduced, prevented or eliminated since the components may be fasten or assembled with the second fasteners. In particular, an axial clamping force for high torque coupling may be efficiently reduced.

FIG. 4 illustrates a top view of a joint system 100 according to a second exemplary embodiment of the invention. In a further exemplary embodiment of the invention the circumferential support rail 30 may be arranged or mounted on the surface 17 of the first fastener 15. Therefore, the joint system may be provided in a space saving manner.

As illustrated in FIG. 4 the at least one planetary gear G1, G2, G3 with the second fastener 20 may be disposed between the dashed threaded fastener 10 and the circumferential support rail 30 such that the at least one planetary gear G1, G2, G3 is rotatable round its axis 22 and the dashed threaded fastener 10 is configured to conduct a rotational movement M1 such that the dashed threaded fastener 10 moves along its axis through the first fastener 15 with the threaded aperture 16. The at least one planetary gear G1, G2, G3 and the circumferential support rail 30 may be configured to rotate simultaneously in an opposite direction M2 to the rotational movement M1 of the dashed threaded fastener 10 (as illustrated in FIG. 3).

In FIG. 4 the first fastener 15 may include three mirror-symmetrically arranged planetary gears G1, G2, G3. Each of the planetary gears G1, G2, G3 may include the second fastener 20. Thus, a relocation or turn of the jointed or assembled components C1, C2 may be prevented.

FIG. 5 illustrates a top view of a joint system according to a third exemplary embodiment of the invention. FIG. 5 is based on FIG. 4 with the difference that the circumferential support rail 30 may be arranged to interact with the three mirror-symmetrically arranged planetary gears G1, G2, G3 without being arranged on the surface 17 of the first fastener 15. In other words, the circumferential support rail 30 surrounds the first fastener 15 without being in contact therewith. For example, the circumferential support rail 30 may be part of or formed integral with the further support tool 31 (as illustrated in FIGS. 1A to 1D). Therefore, the joint system 100 may allow spanning greater bolt joint areas, for example. As illustrated in FIG. 5, the three mirror-symmetrically arranged planetary gears G1, G2, G3 with the corresponding fasteners 20 may be at least partially arranged on the surface 17 of the first fastener.

Figure 6A:
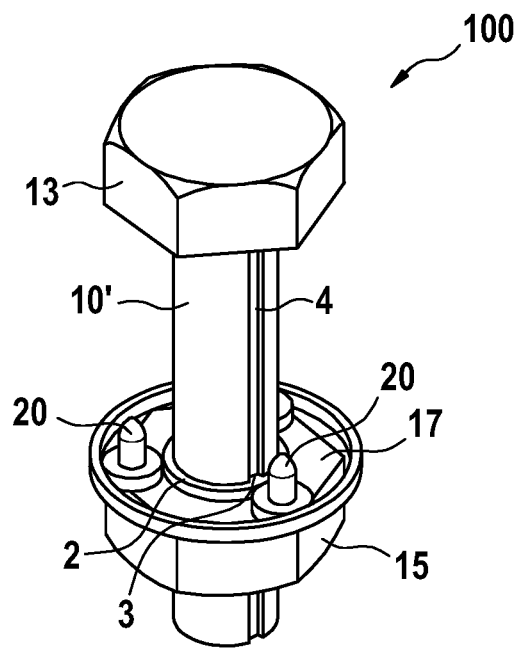
FIGS. 6A and 6B illustrate a joint system according to a fourth exemplary embodiment of the invention.
Figure 6B:
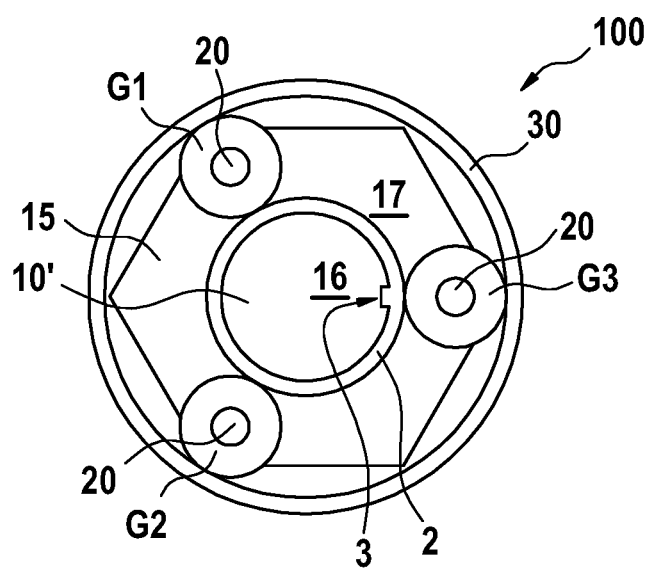

FIGS. 6A and 6B illustrate a joint system according to a fourth exemplary embodiment of the invention, wherein FIG. 6B illustrates a top view of FIG. 6A. The joint system 100 may be based in the joint system 100 of FIGS. 1A to 1D with the difference that the first fastener 15 with the threaded apertures 16 includes an inner support rail 2, wherein the inner support rail 2 has a projection 3 and the projection 3 fits in a groove 4 of the threaded fastener 10. The groove 4 may extend uniaxial along the dashed threaded fastener 10, wherein the inner support rail 2 may be configured to conduct or transfer the rotational movement M1 of the dashed threaded fastener 10. According to this exemplary embodiment the dashed threaded fastener 10 may be replaced by a threaded fastener 10' (e.g., a bolt with the groove 4) with the groove 4 since the rotation M2 of the at least one planetary gear G1, G2, G3 may be conducted via the inner support rail 2 with the projection 3. In other words, the inner support rail 2 may surround the threaded aperture 16 or may be limited to an inner diameter of the threaded aperture 16 (e.g., the size of the inner support rail 2 may be limited to correspond to the inner diameter of the threaded aperture 16). Additionally, the gear teeth of the inner support rail 2 may interact with the at least one planetary gear G1, G2, G3. In particular, the gear teeth of the inner support ring 2 may be oriented toward the at least one planetary gear G1, G2, G3 with the second fastener 20.

Figure 7:
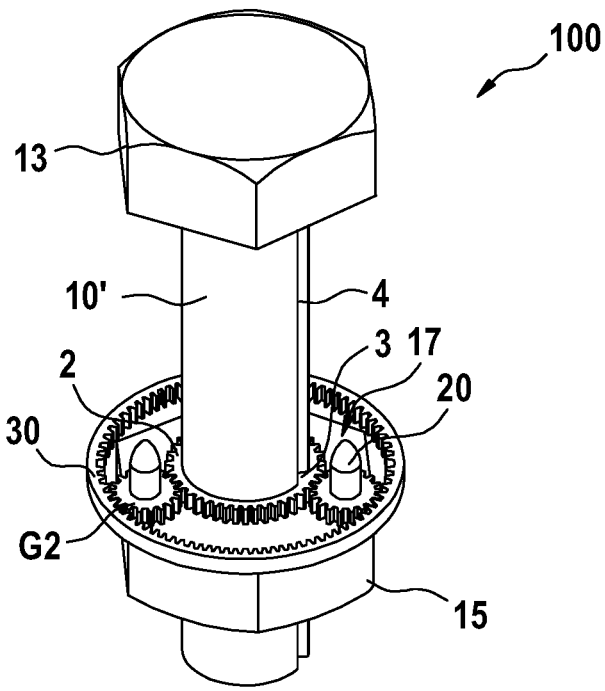
FIG. 7 illustrates a joint system according to a fifth exemplary embodiment of the invention.
Figure 8:
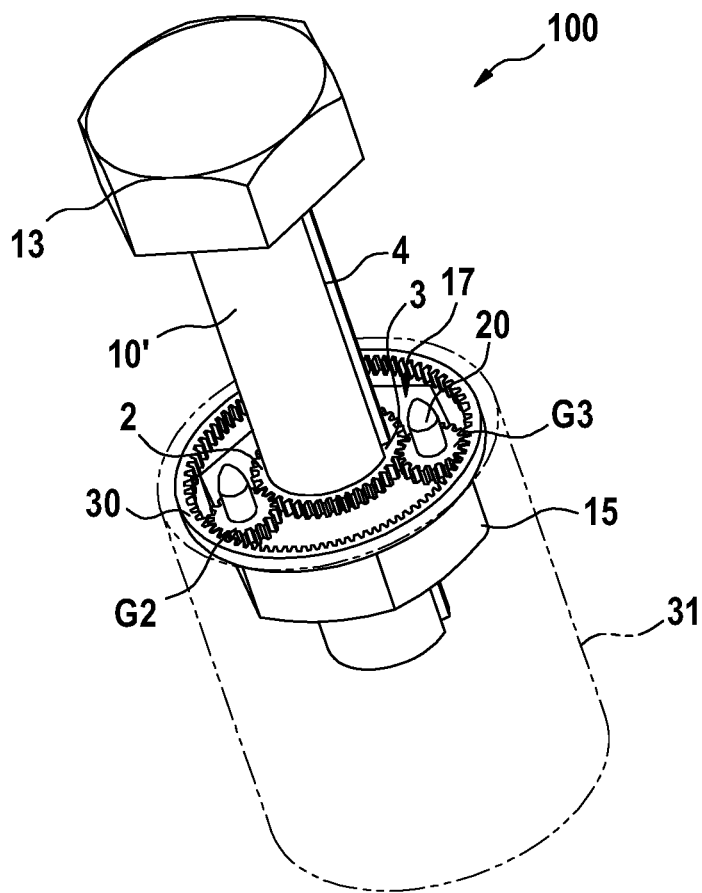
FIG. 8 illustrates a joint system according to a sixth exemplary embodiment of the invention.

In other words, the at least one planetary gear G1, G2, G3 may be disposed between the inner support rail 2 and the circumferential support rail 30 such that the at least one planetary gear G1, G2, G3 is rotatable round its axis 22 (see also FIGS. 7 and 8). As illustrated in FIG. 6B the projection 3 may be disposed in the groove 4 of the dashed threaded fastener 10 or the threaded fastener 10'.

FIG. 7 illustrates a joint system according to a fifth exemplary embodiment of the invention. The joint system 100 of FIG. 7 is based on FIGS. 6A and 6B showing the orientation of the gear teeth of corresponding components, namely the dashed threaded fastener 10 or the threaded fastener 10', the three mirror-symmetrically arranged planetary gears G1, G2, G3 and the circumferential support rail 30 as well as the inner support rail 2.

FIG. 8 illustrates a joint system according to a sixth exemplary embodiment of the invention. The joint system 100 of FIG. 8 is based on FIG. 7, wherein the circumferential support rail 30 may be a part of the further support tool 31. The further support tool 31 may be configured to fix the first fastener 15.

Figure 9:
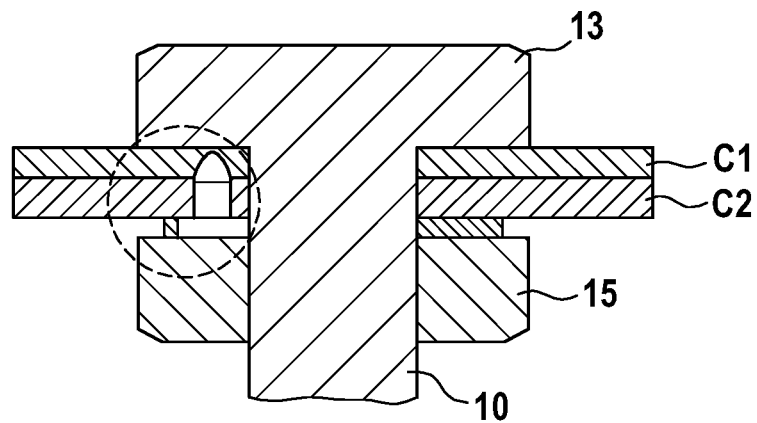
FIG. 9 illustrates a fastened or assembled component based on the joint system according to an exemplary embodiment of the present invention.

FIG. 9 illustrates a fastened or assembled component based on the joint system. As illustrated in FIG. 9 the fastener 20 may be configured to fasten or assemble the components C1, C2. According to the described joint system 100, an axial clamping force for high torque coupling may be efficiently reduced.

Figure 10:
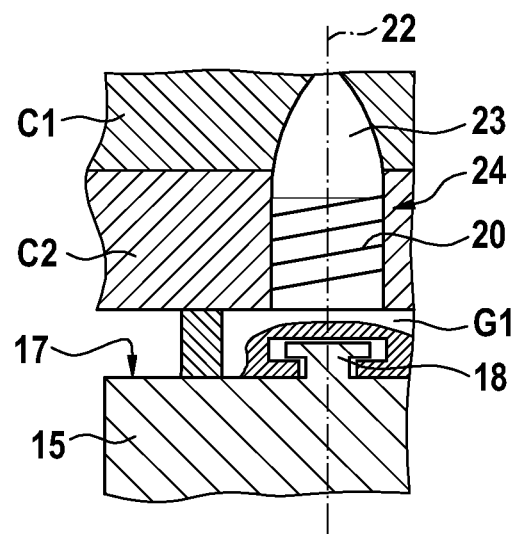
FIG. 10 illustrates a magnified view of FIG. 9 in particular with respect to the planetary gear according to an exemplary embodiment of the present invention.

FIG. 10 illustrates a magnified view of FIG. 9 with respect to the planetary gear. As illustrated in the FIG. 10 the first fastener 15 may include a connecting element 18 on which the at least one planetary gear G1, G2, G3 may be mounted and rotatable. Based on the connecting element 18, the at least one planetary gear G1, G2, G3 may be more easily positioned or mounted on the first fastener 15. The connecting element 18 may therefore be arranged on the surface 17 of the first fastener 15.

Additionally, the second fastener 20 may include a tip 23, wherein the tip 23 has an acute angle. The acute angle of the tip 23 allows the second fastener 20 to enter the unthreaded components C1 more smoothly, C2. For example, the acute angle may be in a range between about 10° to 30°, preferably between about 15° and 25°. The second fastener 20 may further be formed as a helical shape or a screw shape 24. Particularly, the second fastener 20 may be a screw, wherein the second fastener 20 may form a thread in the corresponding components C1, C2 being fastened. Therefore, the second fastener 20 may be introduced in the components C1, C2 more easily.

Although the here afore-mentioned joint system has been described in connection with components or parts, respectively, for a person skilled in the art it is clearly and unambiguously understood that the here described joint system may be applied to various fastening or assembling objects. Generally, this application is intended to cover any adaptations or variations of the specific embodiments discussed herein.

REFERENCE LIST 100 joint system
C1, C2 components
2 inner support rail
3 projection
4 groove
10 dashed threaded fastener
11 thread
12 recesses
13 head
15 first fastener
16 threaded hole
17 surface of the first fastener
18 connecting element
G1; G2; G3 planetary gear
20 second fastener
22 axis of the second fastener
23 tip
24 helical shape or screw shape
30 circumferential support rail
31 further support tool
L1 longitudinal axis
M1 rotational movement
M2 opposite direction of the rotational movement M1
D1 diameter of the dashed threaded fastener
D2 diameter of the planetary gear with the second fastener

What is claimed is:
1. A joint system for fastening or assembling components via a bolted joint, comprising:
  a dashed threaded fastener having a dashed thread;
  a first fastener with a threaded aperture into which the dashed threaded fastener is threaded, wherein the first fastener includes at least one planetary gear with a second fastener on a surface of the first fastener directed toward the dashed threaded fastener, the second fastener being screwed to at least one of the components, and the at least one planetary gear being meshed with the dashed thread; and a circumferential support rail, wherein the at least one planetary gear is disposed between the dashed threaded fastener and the circumferential support rail such that the at least one planetary gear is rotatable round an axis thereof, wherein the dashed threaded fastener is configured to conduct a rotational movement to move the dashed threaded fastener along the axis through the first fastener, and wherein the at least one planetary gear and the circumferential support rail are configured to rotate simultaneously in an opposite direction to the rotational movement of the dashed threaded fastener.

2. The joint system according to claim 1, wherein a gear ratio between the dashed threaded fastener and the at least one planetary gear is such that the rotation in the opposite direction of the second fastener is greater than the rotational movement of the dashed threaded fastener.

3. The joint system according to claim 1, wherein the first fastener includes at least two mirror-symmetrically arranged planetary gears wherein each of the planetary gears includes the second fastener.

4. The joint system according to claim 1, wherein the second fastener includes a tip having an acute angle.

5. The joint system according to claim 1, wherein the second fastener is formed as a helical shape.

6. The joint system according to claim 1, wherein the first fastener includes an inner support rail having a projection and the projection fits in a groove of the threaded fastener.

7. The joint system according to claim 1, wherein the first fastener includes a connecting element on which the at least one planetary gear with the second fastener is mounted and rotatable.

8. The joint system according to claim 1, wherein the at least one planetary gear is formed of a different material than the dashed threaded fastener and the first fastener.

9. The joint system according to claim 1, wherein the circumferential support rail is mounted on the surface of the first fastener.

10. The joint system according to claim 1, wherein the circumferential support rail is formed integrally with a further support tool.

* * * * *